July 21, 1970  H. JÖRG  3,521,503
GEAR HOUSING
Filed July 19, 1968
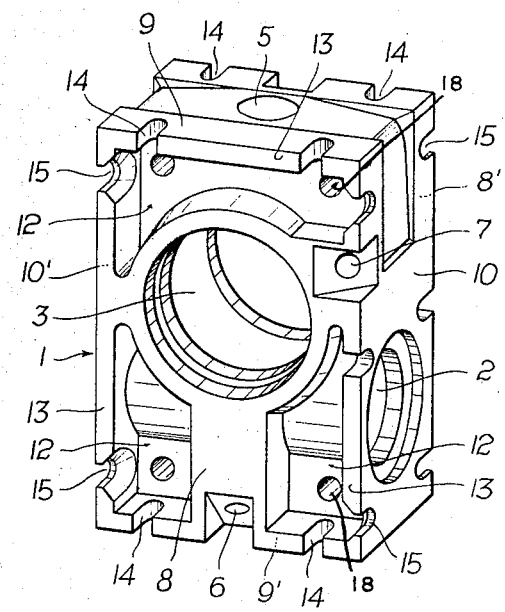
INVENTOR
HELMUT JÖRG
BY
Woodhams, Blanchard & Flynn
ATTORNEYS

United States Patent Office 3,521,503
Patented July 21, 1970

3,521,503
GEAR HOUSING
Helmut Jörg, 8/3 Anton Frankgasse,
A-1180 Vienna, Austria
Filed July 19, 1968, Ser. No. 746,221
Int. Cl. F16h *57/02, 57/04*
U.S. Cl. 74—606    2 Claims

ABSTRACT OF THE DISCLOSURE

A gear housing of substantially rectangular shape having six boundary surfaces perpendicular to each other. Recesses are provided in two oppositely facing surfaces and are bounded at their edges by flange-like projecting edge parts. The flange-like projecting edge parts have slots therein, open at one end, for the introduction of fixing screws. The housing has at least two through bores or slots open at one end and which are perpendicular to the two oppositely facing boundary surfaces for receiving mounting screws.

---

The invention relates to a housing for a gear, for example a worm gear, spur wheel gear, bevel wheel gear, as used for connecting the shaft of a driving motor or engine to the input shaft of the appliance to be driven, with simultaneous speed reduction, or change in the position or direction of the drive axis. Hitherto, in order to meet all the problems arising in this connection, a number of types of gear housings had to be provided, depending on where there was a fixing possibility and on the spatial position in which the gear had to be mounted.

According to the invention there is provided a gear housing of substantially prismatic shape having six boundary planes, each perpendicular to its neighbors, and having recesses on two oppositely situated boundary planes, which recesses are bounded at the edges of the respective plane by flange-like projecting edge parts, wherein the flange-like projecting edge parts are formed with slots open at one end, for the introduction of fixing screws, and wherein the housing has at least two through bores or slots open at one end, which are perpendicular to the two said boundary planes situated opposite to each other.

The first-mentioned slots for the provision of the fixing screws permit fixing in the four planes connecting together the two mutually opposite boundary planes. The through bores, on the other hand, permit fixing of the gear housing to the two mutually opposite boundary planes provided with the recesses. It is advantageous for the slots, open at one end, are conically widened on the inside of the flange-like edge parts for the insertion of countersunk screws. The heads of the countersunk screws may be placed in these conically widened parts and nuts screwed on the other end of the screws.

The gear housing according to the invention may consist of a box-like part with cover set thereon, or also of a single, hollow casting, production being thereby rendered particularly simple and cheap.

An embodiment of the invention will now be described by way of example with reference to the accompanying drawing which is a perspective view of a single hollow casting.

Referring to the drawing, the gear housing 1 is cast in one piece and has a number of openings 2, 3 for the insertion of gear parts and bearings. Furthermore, it has inspection openings 5 for inspection of its oil level or degree of wear of the gear, and finally, on some edges with oblique axis it has openings 6, 7 for the replenishment or discharge of lubricant or for venting in the event of heating of the gear. The housing has a prismatic shape with six boundary planes 8, 8′, 9, 9′ and 10, 10′, perpendicular to each other. The arrangements permitting the fixing of the housing in all these six planes are as follows:

In the two principal boundary planes 8, 8′, representing the largest faces of the prism, recesses 12 are provided, which are closed by flange-like projecting edge parts 13 from the edges of the said principal boundary planes. Slots 14, 15, open at one end, are provided in the said flanges, the said slots serving for the introduction of screw bolts, the screw heads bearing against the inside of the flanges 13. To permit fixing also on two abutting boundary planes 8, 9, the slots 15 are conically widened inwardly, so that the heads of the countersunk screws may be inserted in these widened portions without projecting inwardly.

Simultaneous provision of screw bolts in the slot 14 and countersunk screws in the slot 15 is thereby possible, for example. Of course, all the slots may also be conically widened inwardly. In order furthermore to permit fixing of the gear housing on the principal planes 8, 8′, vertically extending bores 18 are here provided on the bottom of the recesses 12, advantageously these bores extend through the solid material of the housing to prevent escape of lubricant through these openings. Also these openings may be conically widened at the ends, to permit countersunk insertion of conical screwheads.

By means of the above-mentioned fixing means, such a gear housing may be fixed on each of the boundary planes by direct screwing to an adjacent component, whether to a motor or engine flange or to the housing of an appliance to be driven or also to a second like gear for achieving double transmission in the simplest way. It is thus possible for a single form of gear housing to solve all fixing problems.

The embodiments of the invention in which an exclusive property or privilege is claimed are defined as follows:

1. A gear housing of substantially prismatic shape having six boundary planes, each perpendicular to its neighbors, and having recesses on two oppositely situated boundary planes, which recesses are bounded at the edges of the respective planes by flange-like projecting edge parts, wherein the flange-like projecting edge parts are formed with slots, open at one end, for the introduction of fixing screws, and wherein the housing has at least two through openings the longitudinal directions of which are perpendicular to the two said boundary planes situated opposite to each other.

2. A gear housing according to claim 1, wherein the slots are widened conically on the inside of the flange-like edge parts to accommodate the head of countersunk screws.

References Cited
UNITED STATES PATENTS

| | | | |
|---|---|---|---|
| 2,623,406 | 12/1952 | Hansen | 74—606 |
| 2,989,995 | 6/1961 | Happe. | |
| 3,001,409 | 9/1961 | Von Fumetti | 74—606 XR |

FRED C. MATTERN, JR., Primary Examiner

F. D. SHOEMAKER, Assistant Examiner